(12) United States Patent
Tsutsui

(10) Patent No.: US 12,534,069 B2
(45) Date of Patent: Jan. 27, 2026

(54) VEHICLE CONTROL DEVICE

(71) Applicant: HITACHI ASTEMO, LTD., Hitachinaka (JP)

(72) Inventor: Takashi Tsutsui, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 143 days.

(21) Appl. No.: 18/254,913

(22) PCT Filed: Sep. 7, 2021

(86) PCT No.: PCT/JP2021/032906
§ 371 (c)(1),
(2) Date: May 30, 2023

(87) PCT Pub. No.: WO2022/153590
PCT Pub. Date: Jul. 21, 2022

(65) Prior Publication Data
US 2024/0042994 A1    Feb. 8, 2024

(30) Foreign Application Priority Data

Jan. 18, 2021 (JP) .................................. 2021-005866

(51) Int. Cl.
*B60W 30/08* (2012.01)
*B60W 40/068* (2012.01)
*B60W 40/105* (2012.01)

(52) U.S. Cl.
CPC .......... *B60W 30/08* (2013.01); *B60W 40/068* (2013.01); *B60W 40/105* (2013.01)

(58) Field of Classification Search
CPC .. B60W 30/08; B60W 40/068; B60W 40/105; B60W 30/143; B60W 2552/30;
(Continued)

(56) References Cited

U.S. PATENT DOCUMENTS 6,175,799 B1   1/2001   Tsutsumi et al.
10,372,136 B2 *   8/2019   Yang .................. G01C 21/3691
(Continued)

FOREIGN PATENT DOCUMENTS

CN   206049660 U   3/2017
CN   110667576 A   1/2020
(Continued)

OTHER PUBLICATIONS

International Search Report with English Translation and Written Opinion of International Patent Application No. PCT/JP2021/032906 dated Oct. 12, 2021 (8 pages).

(Continued)

*Primary Examiner* — Scott A Reinbold
(74) *Attorney, Agent, or Firm* — Foley & Lardner LLP

(57) ABSTRACT

The present disclosure provides a vehicle control device capable of improving safety of a vehicle. A vehicle control device according to the present disclosure includes a target speed calculation unit 126 that calculates a target speed of a vehicle. The target speed calculation unit 126 includes a first speed calculation unit 126a, a second speed calculation unit 126b, and a target speed setting unit 126f. The first speed calculation unit 126a calculates, by using a friction coefficient of a road surface and a route length of a target route to an outer edge of a sensing range of an external environment sensor of the vehicle, a first speed at which the vehicle can stop at a stop position before the outer edge. The second speed calculation unit 126b calculates, by using a curvature radius of the target route of the vehicle and the friction coefficient, a second speed at which the vehicle can follow the target route. The target speed setting unit 126f selects the minimum speed of the first speed and the second speed, and sets the minimum speed as the target speed.

8 Claims, 11 Drawing Sheets

(58) Field of Classification Search
CPC ......... B60W 2552/40; B60W 2555/60; B60W 2720/10
USPC .......................................................... 701/70
See application file for complete search history.

(56) References Cited

U.S. PATENT DOCUMENTS

| | | |
|---|---|---|
| 2018/0194354 A1 | 7/2018 | Takeda |
| 2020/0180614 A1* | 6/2020 | Goto .................. B60W 30/095 |
| 2020/0384999 A1* | 12/2020 | Ohmura ............ B60W 30/0956 |
| 2020/0391764 A1 | 12/2020 | Gotou et al. |
| 2021/0114620 A1 | 4/2021 | Yu et al. |
| 2021/0245762 A1* | 8/2021 | Tsuru .............. B60W 30/18145 |

FOREIGN PATENT DOCUMENTS

| | | |
|---|---|---|
| JP | 11-314537 A | 11/1999 |
| JP | 2016-103131 A | 6/2016 |
| JP | 2017-100653 A | 6/2017 |
| WO | WO-2017/022448 A1 | 2/2017 |
| WO | WO-2019/008647 A1 | 1/2019 |

OTHER PUBLICATIONS

Nissan Motor Co., Ltd., "Intelligent pedal with car navigation cooperative function", Searched on Dec. 17, 2020, Internet, URL: https://www.nissan-global.com/JP/TECHNOLOGY/OVERVIEW/ndca.html, with English Translation (3 pages).

Chinese Office Action issued in corresponding CN Application No. 202180080715.0 dated Nov. 26, 2025 with English translation (13 Pages).

* cited by examiner

VEHICLE CONTROL DEVICE

TECHNICAL FIELD

The present disclosure relates to a vehicle control device.

BACKGROUND ART

Conventionally, an invention related to a technique for controlling a vehicle speed when a vehicle travels on a curve has been known (PTL 1 below). The travel control device disclosed in PTL 1 includes a first vehicle speed setting unit, a second vehicle speed setting unit, a target setting unit, and a vehicle speed control unit (Claim 1 and paragraph [0007] in PTL 1).

The first vehicle speed setting unit sets a first vehicle speed range in which a frictional force received by a host vehicle in a direction opposite to a centrifugal force when the host vehicle travels on a curve is larger than the centrifugal force received by the host vehicle when the host vehicle travels on the curve. The second vehicle speed setting unit sets a second vehicle speed range by using a contact portion between a tire and a road surface outside the curve of the host vehicle as a rotation axis. In the second vehicle speed range, when the vehicle travels on the curve, a second moment acting on the rotation axis due to the weight of the host vehicle is larger than a first moment acting on the rotation axis due to the centrifugal force (Claim 1 and paragraph [0008] in PTL 1).

The target setting unit sets a target vehicle speed of the host vehicle in a target vehicle speed range that satisfies both the first vehicle speed range and the second vehicle speed range. The vehicle speed control unit causes the host vehicle to travel at the target vehicle speed set by the target setting unit when the host vehicle travels on the curve (Claim 1 and paragraph [0009] in PTL 1).

According to this configuration, it is possible to suppress sideslip of the host vehicle caused by a centrifugal force larger than a frictional force when the host vehicle travels on a curve. In addition, it is possible to prevent an occurrence of a situation in which the first moment acting on the rotation axis due to the centrifugal force becomes larger than the second moment acting on the rotation axis due to the weight of the host vehicle, and thus the host vehicle is inclined to the outside of the curve (paragraph [0010] in PTL 1).

In addition, there is known an intelligent pedal with a car navigation cooperative function, which supports a deceleration operation of a driver in accordance with a size of a corner and the vehicle speed of the host vehicle when the vehicle enters the corner ("Outline of System" in NPL 1 below). The system includes a car navigation, a brake actuator, an active accelerator pedal, and a controller ("System Configuration" in NPL 1).

CITATION LIST

Patent Literature

PTL 1: JP 2017-100653 A

Non-Patent Literature

NPL 1: Nissan Motor Co., Ltd., "Intelligent pedal with car navigation cooperative function", [online], [searched on Dec. 17, 2020], Internet, <URL: https://www.nissan-global.com/JP/TECHNOLOGY/OVERVIEW/ndca.html>

SUMMARY OF INVENTION

Technical Problem

In the above-described conventional technique, for example, there is a concern that the safety of the vehicle is deteriorated due to an obstacle that cannot be detected by an external environment sensor mounted on the vehicle while the vehicle is traveling on a target route including a curve.

The present disclosure provides a vehicle control device capable of improving safety of a vehicle as compared with the conventional technique.

Solution to Problem

According to an aspect of the present disclosure, there is provided a vehicle control device including a target speed calculation unit that calculates a target speed of a vehicle. The target speed calculation unit includes a first speed calculation unit that calculates, by using a friction coefficient of a road surface and a route length of a target route of the vehicle up to an outer edge of a sensing range of an external environment sensor of the vehicle, a first speed at which the vehicle is able to stop at a stop position before the outer edge, a second speed calculation unit that calculates, by using a curvature radius of the target route and the friction coefficient, a second speed at which the vehicle is able to follow the target route, and a target speed setting unit that selects a minimum speed of the first speed and the second speed and sets the minimum speed as the target speed.

Advantageous Effects of Invention

According to the above aspect of the present disclosure, it is possible to provide a vehicle control device capable of improving safety of a vehicle as compared with the above conventional technique.

DESCRIPTION OF EMBODIMENTS

Figure 1:
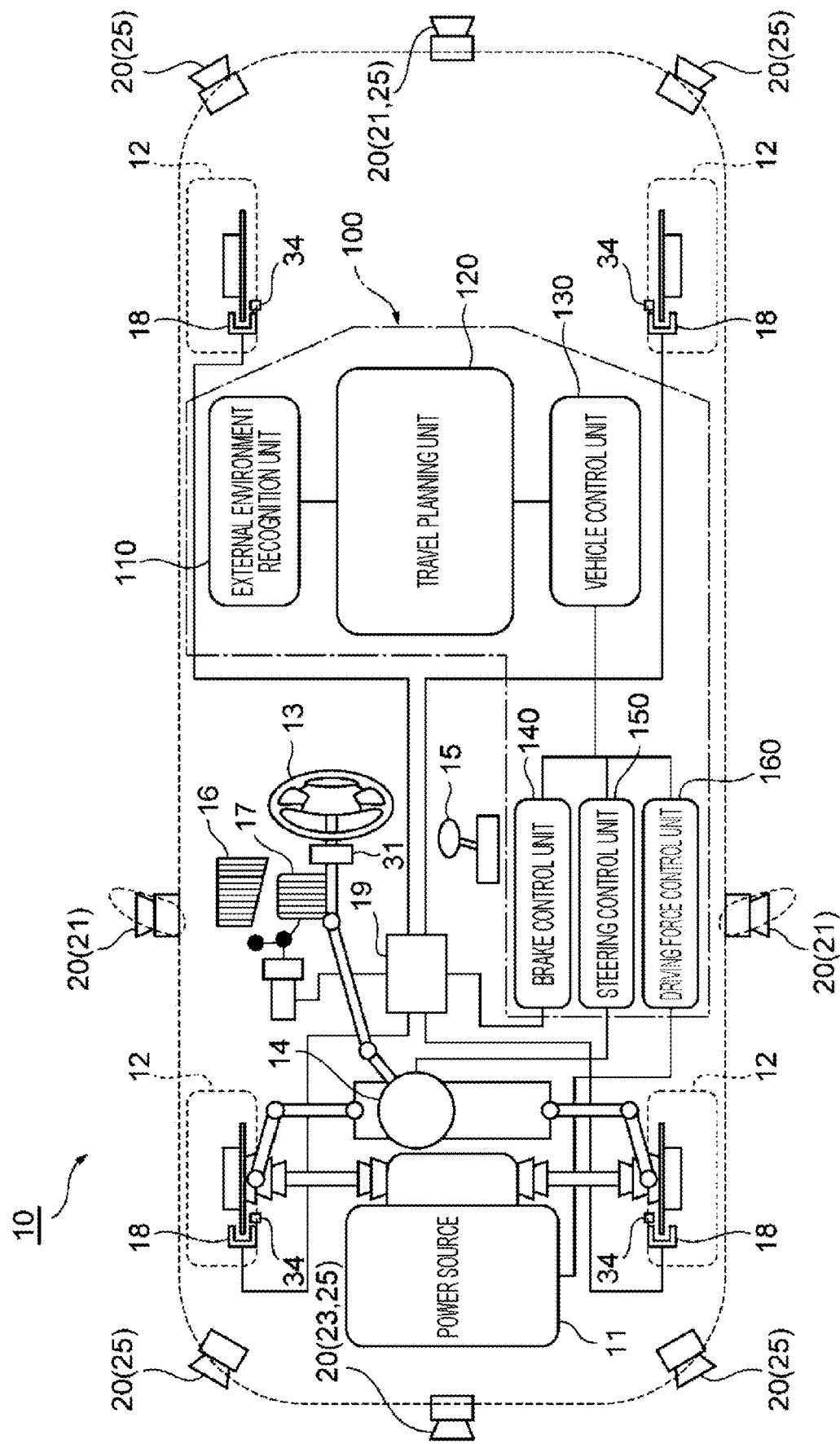
FIG. 1 is a schematic diagram of a vehicle illustrating an embodiment of a vehicle control device according to the present disclosure.
Figure 2:
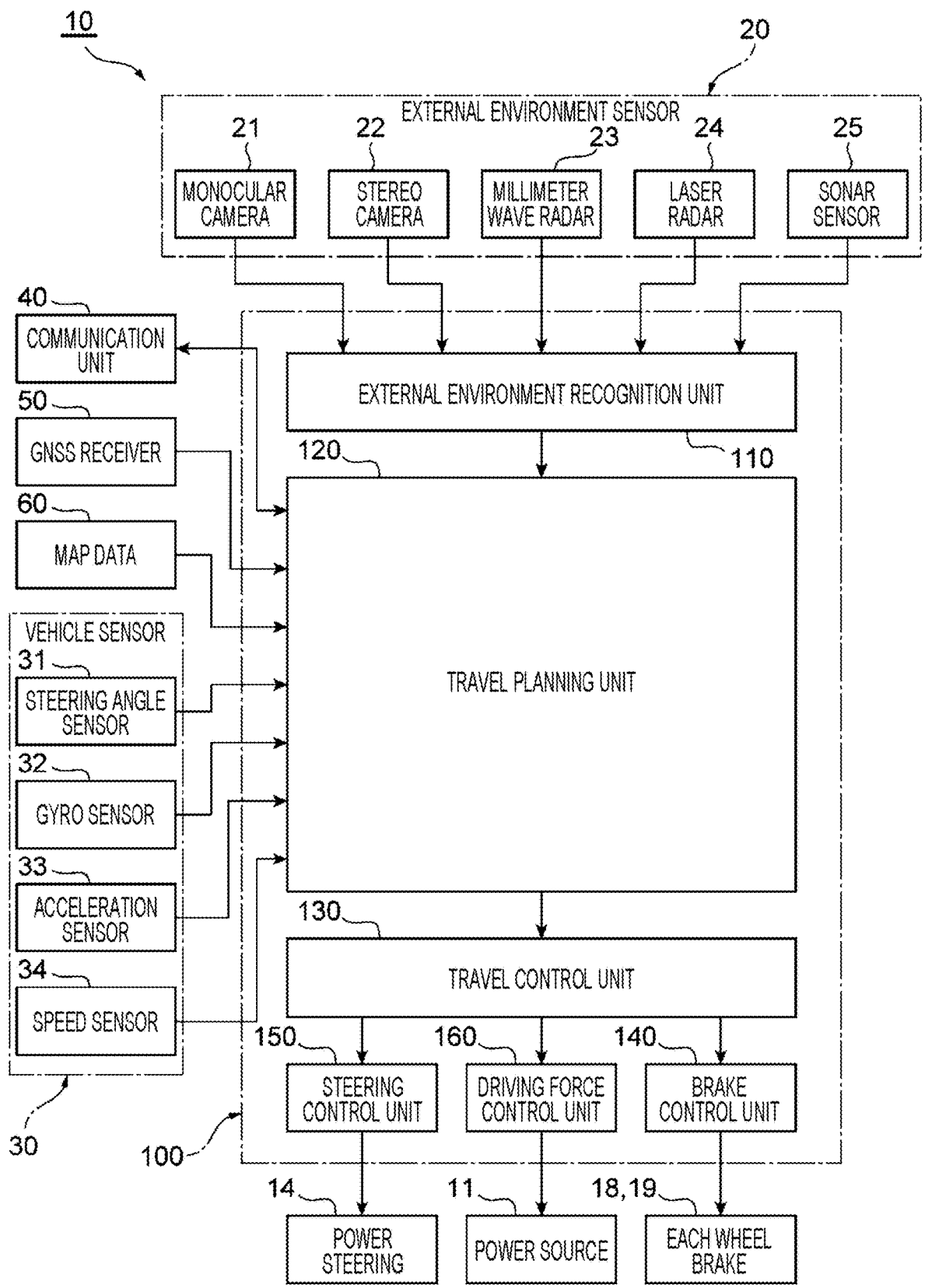
FIG. 2 is a block diagram of the vehicle illustrated in FIG. 1.

Hereinafter, embodiments of a vehicle control device according to the present disclosure will be described with reference to the drawings. FIG. 1 is a schematic diagram of a vehicle 10 illustrating an embodiment of a vehicle control device according to the present disclosure. FIG. 2 is a block diagram of the vehicle 10 illustrated in FIG. 1.

The vehicle 10 includes, for example, a power source 11, wheels 12, a steering wheel 13, a power steering 14, a shift lever 15, an accelerator pedal 16, a brake pedal 17, a brake caliper 18, and a hydraulic unit 19. The vehicle 10 further includes, for example, an external environment sensor 20, a vehicle sensor 30, a communication unit 40, a GNSS receiver 50, map data 60, and a vehicle control device 100. The configuration of each unit of the vehicle 10 will be described in detail below.

The power source 11 is, for example, at least one of an engine and a motor, and drives the wheels 12 via a transmission. The wheel 12 has a tire which is a grounding portion of the vehicle 10. The friction coefficient μ between the tire of the wheel 12 that is the grounding portion of the vehicle 10 and a road surface on which the vehicle 10 travels changes depending on, for example, the state of the road surface and the weather condition. The steering wheel 13 is operated by a driver who is an occupant of the vehicle 10 during manual driving. The power steering 14 generates a steering force according to the operation of the steering wheel 13.

The shift lever 15 is used for an operation of switching the state of the transmission such as "D", "N", "P", and "R" by the driver during manual driving of the vehicle 10, for example. The accelerator pedal 16 increases or decreases the driving force output from the power source 11 when the driver increases or decreases the operation amount during manual driving of the vehicle 10, for example. The brake pedal 17 increases or decreases the braking force generated by the brake caliper 18 via the hydraulic unit 19 when the driver increases or decreases the operation amount during manual driving of the vehicle 10, for example.

The external environment sensor 20 is a sensor that acquires external environment information around the vehicle 10. The external environment sensor 20 includes, for example, a monocular camera 21, a stereo camera 22, a millimeter wave radar 23, a laser radar 24, and a sonar sensor 25. The external environment sensor 20 acquires, for example, a distance and a direction from the vehicle 10 to an object, a relative speed of the object with respect to the vehicle 10, and the like, as the external environment information by these sensors.

Note that, as long as the external environment sensor 20 includes at least the stereo camera 22, a target speed $V_{tgt}$ can be calculated by a target speed calculation unit 126 of the vehicle control device 100 described later. That is, the external environment sensor 20 may not include any one or more of the monocular camera 21, the millimeter wave radar 23, the laser radar 24, and the sonar sensor 25, for example.

The vehicle sensor 30 is a sensor that acquires travel information including the speed of the vehicle 10. The vehicle sensor 30 includes, for example, a steering angle sensor 31, a gyro sensor 32, an acceleration sensor 33, and a speed sensor 34. That is, the vehicle sensor 30 acquires travel information of the vehicle 10 including the steering angle, the angular velocity of roll, pitch, and yaw, the acceleration and deceleration in the front-rear direction of the vehicle 10, the lateral acceleration of the vehicle 10 in the lateral direction, the speed of the vehicle 10, and the like by the above sensors, for example. Note that, as the speed sensor 34, for example, a wheel speed sensor can be used.

The communication unit 40 is connected to an external server such as a road manager via, for example, a wireless communication line and an Internet line, acquires various types of information such as road information, weather information, and a road surface condition, and inputs the acquired information to the vehicle control device 100. Furthermore, the communication unit 40 can transmit information output from the vehicle control device 100 to the outside via a wireless communication line, for example. Furthermore, for example, the communication unit 40 can receive information detected by a sensor installed on a road or in an infrastructure outside the vehicle 10, and input the received information to the vehicle control device 100.

The GNSS receiver 50 receives radio waves from a plurality of positioning satellites, acquires position information of the vehicle 10, and inputs the position information to the vehicle control device 100. The map data 60 is stored in, for example, a storage device mounted on the vehicle 10, and inputs map information based on position information of the vehicle 10 to the vehicle control device 100. Note that the map data 60 is not necessarily stored in the storage device mounted on the vehicle 10, and may be received from the outside via the communication unit 40, for example.

The vehicle control device 100 is, for example, an electronic control device configured by a microcomputer including a central processing unit (CPU), a memory, a program, a timer, an input/output unit, and the like. The vehicle control device 100 includes, for example, an external environment recognition unit 110, a travel planning unit 120, a travel control unit 130, a brake control unit 140, a steering control unit 150, and a driving force control unit 160. Each unit of the vehicle control device 100 may be configured by a microcomputer, or two or more units may be integrated into one microcomputer. Furthermore, each unit of the vehicle control device 100 may represent a function of the vehicle control device 100, which is realized by the CPU executing a program, for example.

The external environment recognition unit 110 is, for example, a sensor fusion controller, and acquires external environment information from the external environment sensor 20 to recognize an object. The external environment recognition unit 110 integrates and selects information acquired from a plurality of sensors of the external environment sensor 20, such as the monocular camera 21, the stereo camera 22, the millimeter wave radar 23, the laser radar 24, and the sonar sensor 25, for example, to secure reliability necessary for automatic driving of the vehicle 10. In addition, the external environment recognition unit 110 outputs the recognition result of an object based on the external environment information acquired from the external environment sensor 20 to the travel planning unit 120 in an appropriate format.

Figure 3:
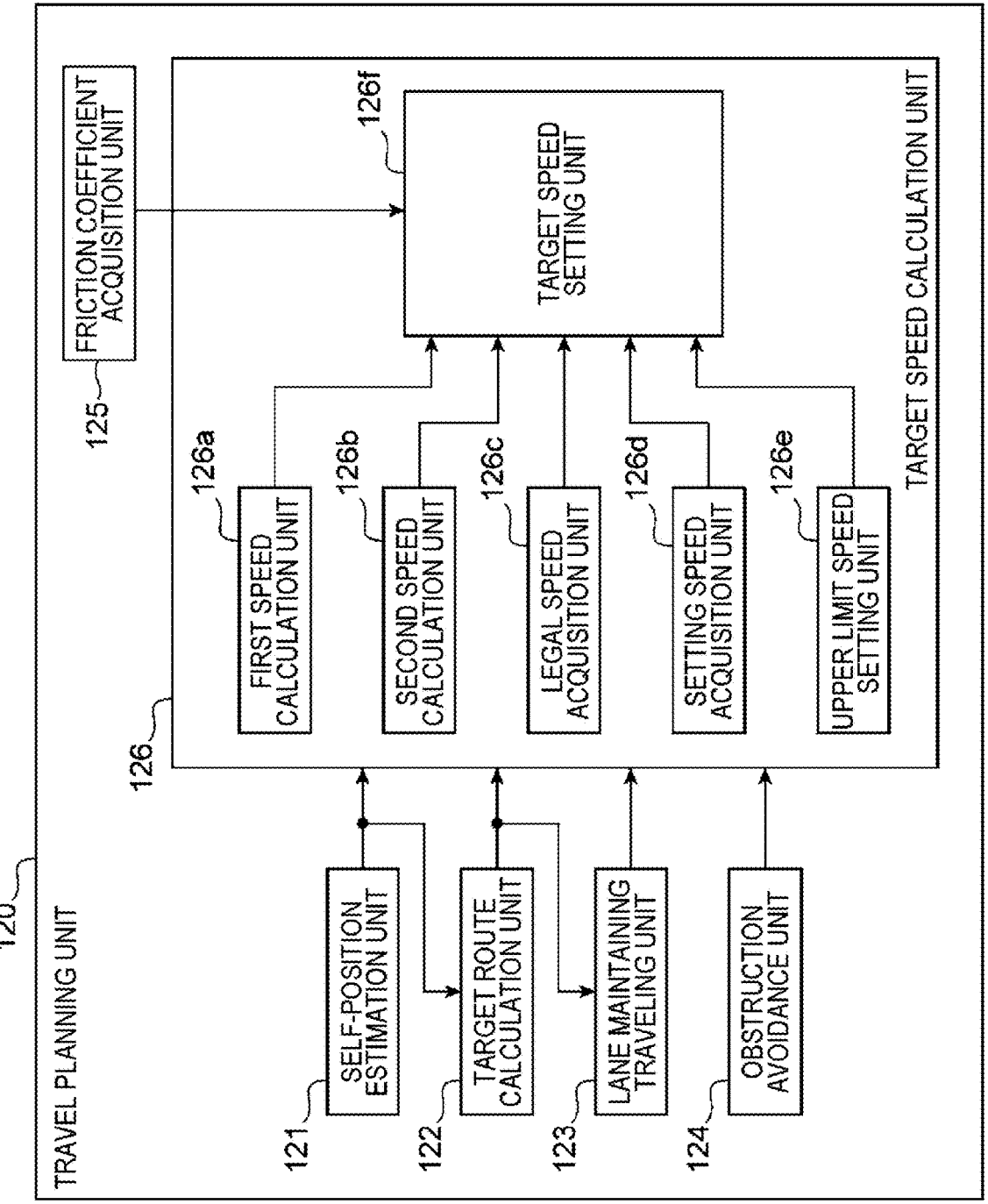
FIG. 3 is a block diagram of a travel planning unit illustrated in FIG. 2.

FIG. 3 is a block diagram of the travel planning unit 120 illustrated in FIG. 2. For example, the travel planning unit 120 acquires travel information including the speed of the vehicle 10 from the vehicle sensor 30, acquires the recognition result of an object from the external environment recognition unit 110, and generates a travel plan of the vehicle 10. The travel planning unit 120 includes, for example, a self-position estimation unit 121, a target route calculation unit 122, a lane maintaining traveling unit 123, an obstacle avoidance unit 124, a friction coefficient acquisition unit 125, and a target speed calculation unit 126. Note that the travel planning unit 120 can calculate a target speed $V_{tgt}$ to be described later as long as the travel planning unit 120 includes at least the target speed calculation unit 126.

The self-position estimation unit 121 estimates the position of the vehicle 10 based on, for example, the position information of the vehicle 10 input from the GNSS receiver

50 and the map information around the vehicle 10, which is acquired from the map data 60. Then, the self-position estimation unit 121 outputs the estimated position of the vehicle 10 to the target speed calculation unit 126. Furthermore, the self-position estimation unit 121 may estimate the position of the vehicle 10 based on the detection result of the vehicle sensor 30 in addition to the position information of the vehicle 10 input from the GNSS receiver 50 and the map information acquired from the map data 60.

The target route calculation unit 122 calculates the target route of the vehicle 10 based on, for example, the position of the vehicle 10 estimated by the self-position estimation unit 121, the destination of the vehicle 10 set by the occupant of the vehicle 10, and the map information acquired from the map data 60.

For example, when the vehicle 10 is automatically driven, the lane maintaining traveling unit 123 calculates a control amount for causing the vehicle 10 to travel while maintaining the same lane, without requiring the steering operation of the driver of the vehicle 10.

The obstacle avoidance unit 124 calculates a travel route of the vehicle 10 for avoiding an obstacle existing on the target route of the vehicle 10, based on the recognition result of the external environment recognition unit 110, for example. Estimation results and calculation results of the self-position estimation unit 121, the target route calculation unit 122, the lane maintaining traveling unit 123, and the obstacle avoidance unit 124 are output to the target speed calculation unit 126 and the travel control unit 130, for example.

The friction coefficient acquisition unit 125 acquires, for example, a friction coefficient μ between a tire that is a grounding portion of the vehicle 10 and a road surface on which the vehicle 10 travels. A method of acquiring the friction coefficient μ by the friction coefficient acquisition unit 125 is not particularly limited. The friction coefficient acquisition unit 125 can acquire the friction coefficient μ by a known method such as estimation based on a vibration behavior of a tread of the tire, estimation based on the lateral acceleration and a yaw angular velocity of the vehicle 10, or estimation from a slip angle of the wheel 12 and the lateral acceleration of the vehicle 10, for example. The friction coefficient acquisition unit 125 outputs the acquired friction coefficient μ to the target speed calculation unit 126.

The target speed calculation unit 126 includes a first speed calculation unit 126a, a second speed calculation unit 126b, and a target speed setting unit 126f, for example. Furthermore, the target speed calculation unit 126 can include, for example, at least one of a legal speed acquisition unit 126c, a setting speed acquisition unit 126d, or an upper limit speed setting unit 126e. Each unit of the target speed calculation unit 126 illustrated in FIG. 3 indicates each function of the target speed calculation unit 126 which is realized by executing a program by the CPU, for example.

Figure 4:
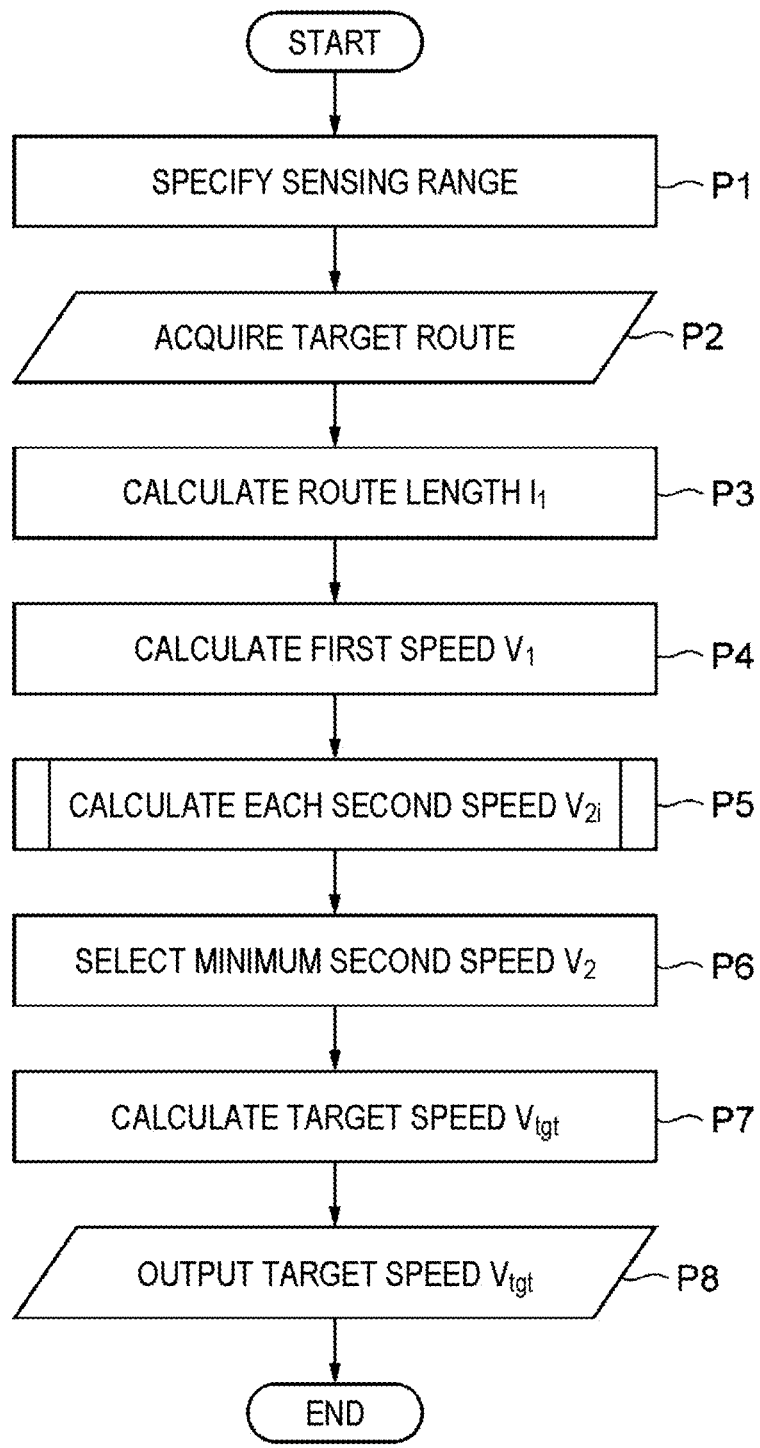
FIG. 4 is a flowchart illustrating an example of a process of a target speed calculation unit illustrated in FIG. 3.
Figure 10:
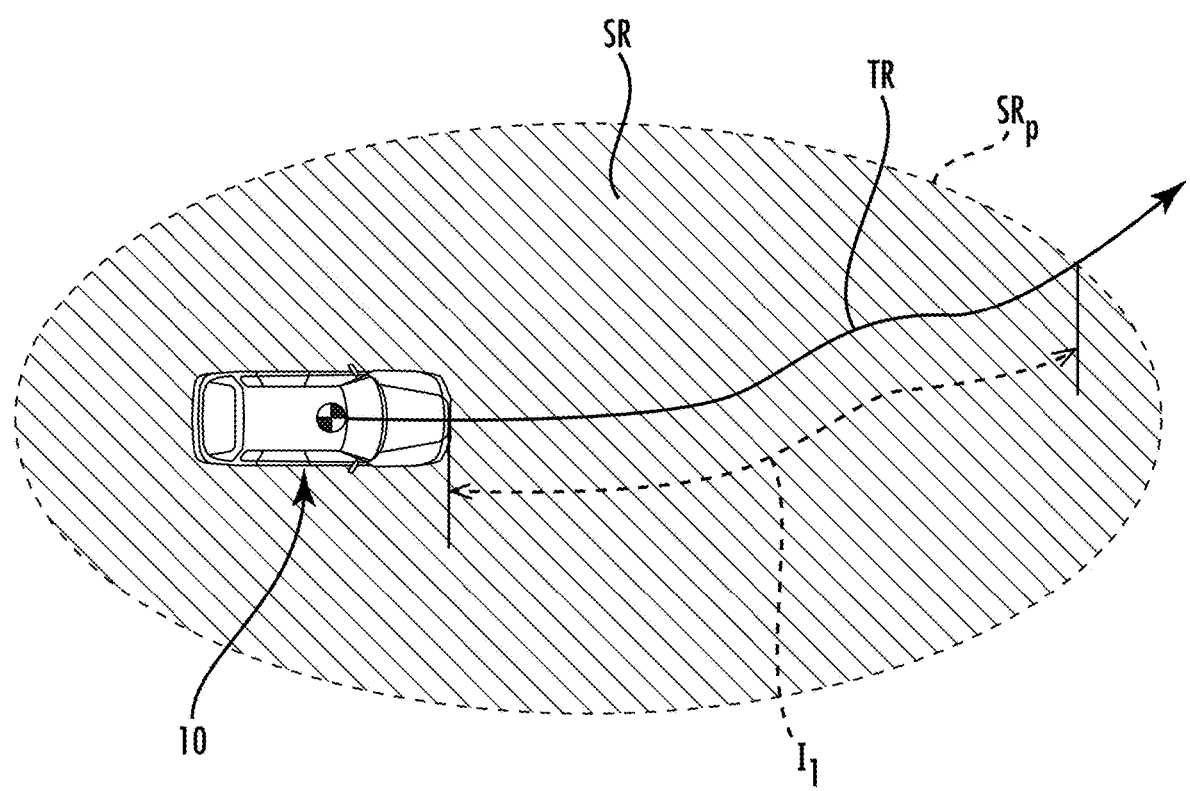
FIG. 10 is an explanatory diagram of a process of outputting a target speed from a process of acquiring a target route illustrated in FIG. 4.
Figure 11:
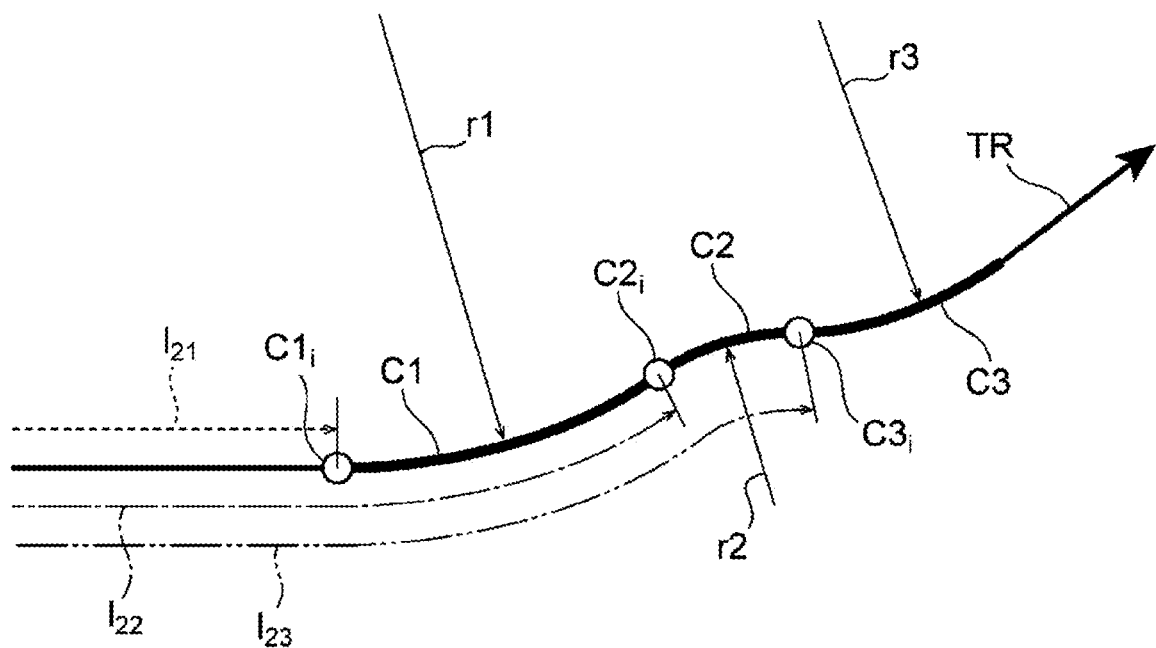
FIG. 11 is a plan view for explaining a process of calculating each second speed illustrated in FIG. 4.

FIG. 4 is a flowchart illustrating an example of a process of the target speed calculation unit 126 illustrated in FIG. 3. FIGS. 5 to 9 are plan views of the vehicle 10 for explaining a process P1 of specifying a sensing range illustrated in FIG. 4. In addition, FIG. 10 is a plan view for explaining processes from a process P2 of acquiring the target route illustrated in FIG. 4 to a process P8 for outputting the target speed $V_{tgt}$. FIG. 11 is a plan view illustrating a process P5 of calculating each second speed $V_{2i}$ illustrated in FIG. 4.

When starting processing illustrated in FIG. 4, the target speed calculation unit 126 first executes the process P1 of specifying the sensing range of the external environment sensor 20. In this process P1, the first speed calculation unit 126a specifies the sensing range SR of the external environment sensor 20 as described below, for example. Note that the function of specifying the sensing range SR of the external environment sensor 20 can also be provided independently of the first speed calculation unit 126a, for example, as a sensing range specification unit. In this case, the sensing range specifying unit can be provided, for example, in the target speed calculation unit 126, in the travel planning unit 120, or in the external environment recognition unit 110.

The first speed calculation unit 126a specifies, as the sensing range SR, a detectable range of an object based on specifications of the monocular camera 21, the stereo camera 22, the millimeter wave radar 23, the laser radar 24, the sonar sensor 25, and the like, for example. The detectable range of the object based on the specification of the external environment sensor 20 as described above is stored in advance in a memory of the travel planning unit 120, for example.

Figure 5:
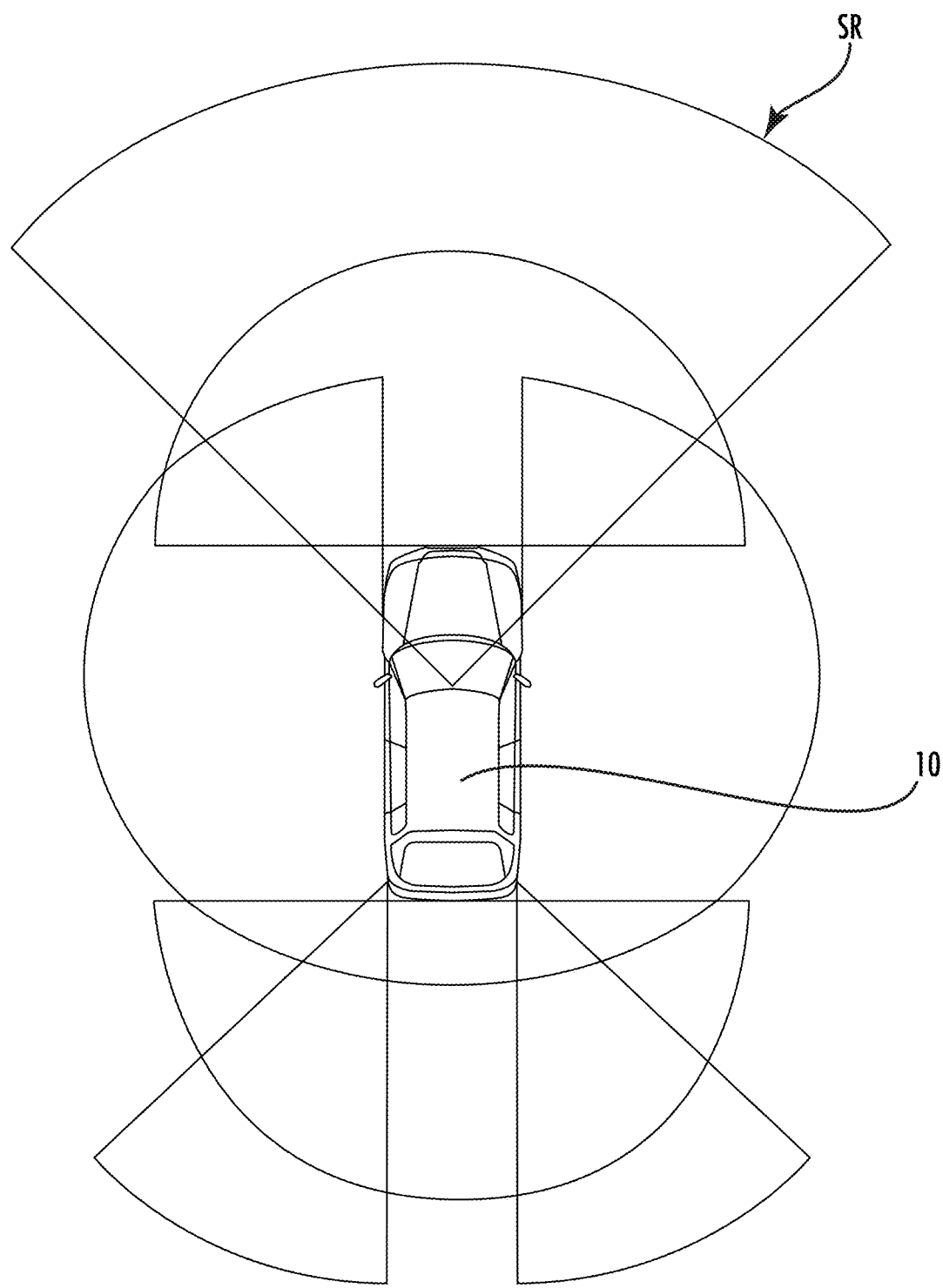
FIG. 5 is a plan view of the vehicle for explaining a process of specifying a sensing range illustrated in FIG. 4.
Figure 6:
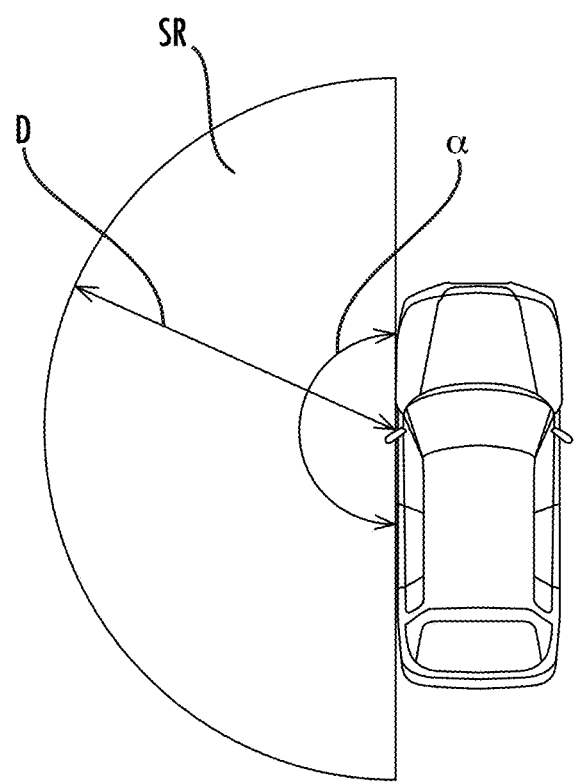
FIG. 6 is a plan view of the vehicle for explaining the process of specifying the sensing range illustrated in FIG. 4.

Specifically, for example, as illustrated in FIGS. 5 and 6, the first speed calculation unit 126a specifies the sensing range SR based on the detectable distance D of each sensor constituting the external environment sensor 20 mounted on the vehicle 10, a detectable angle α such as the view angle of each sensor, and the overlapping detectable ranges.

Figure 7:
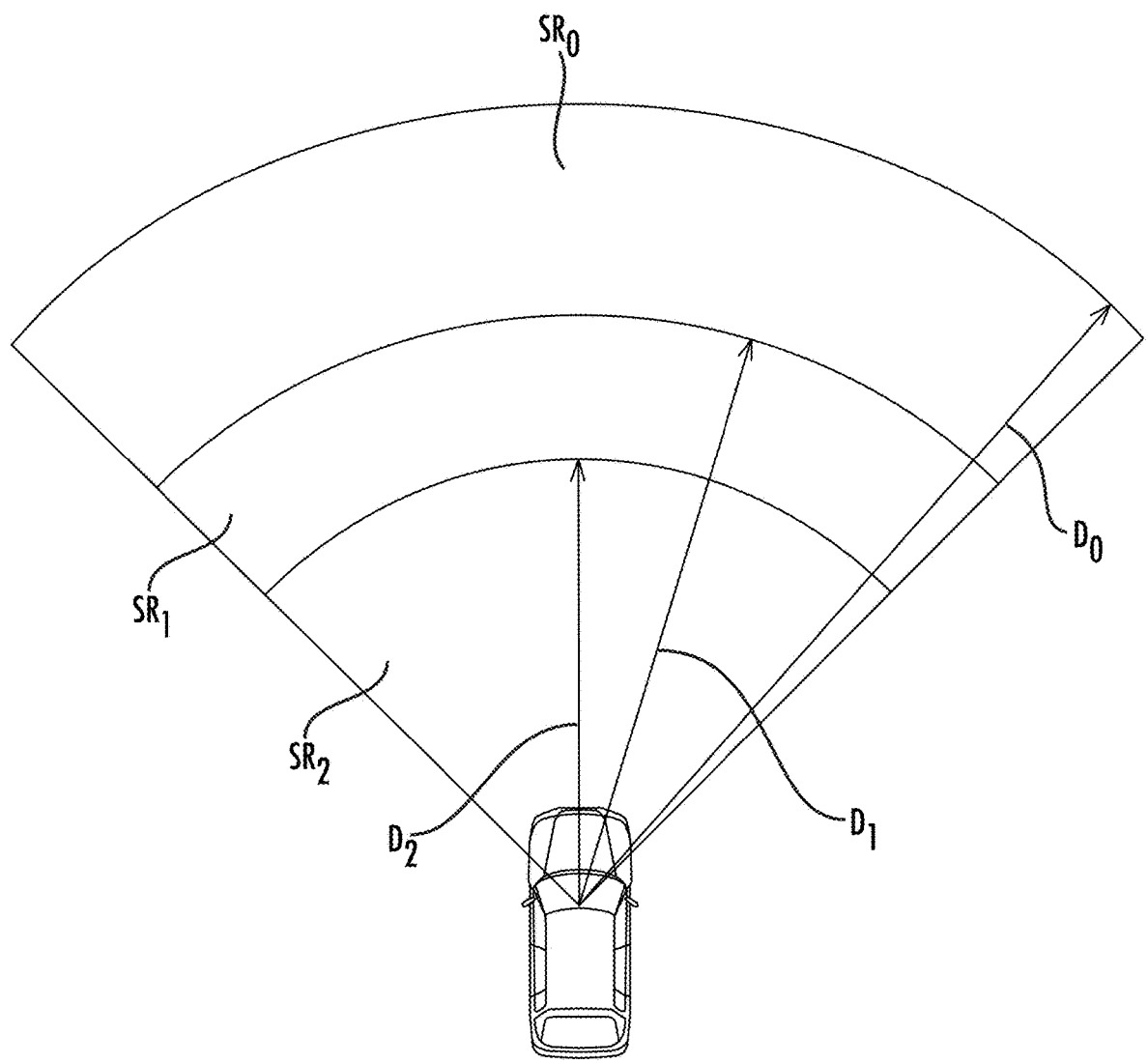
FIG. 7 is a plan view of the vehicle for explaining the process of specifying the sensing range illustrated in FIG. 4.

Furthermore, for example, as illustrated in FIG. 7, the first speed calculation unit 126a may specify the reduced or enlarged sensing range SR of the monocular camera 21 or the stereo camera 22 in accordance with the weather condition. In this case, the first speed calculation unit 126a can acquire a rainfall amount, a snowfall amount, or a fog concentration based on the state (weak, medium, strong) of a wiper switch, an image of the monocular camera 21 or the stereo camera 22, or weather information received via the communication unit 40, for example.

More specifically, for example, the first speed calculation unit 126a sets a threshold value in the weather condition such as the rainfall amount, the snowfall amount, and the fog concentration. When a value exceeds the threshold value, the first speed calculation unit 126a specifies the sensing range SR reduced from the previous sensing range SR. In the example illustrated in FIG. 7, the first speed calculation unit 126a specifies a sensing range $SR_0$ of the most enlarged detectable distance $D_0$ until the rainfall amount, the snowfall amount, or the fog concentration exceeds a first threshold value.

In addition, in the example illustrated in FIG. 7, until the rainfall amount, the snowfall amount, or the fog concentration exceeds the first threshold value and exceeds a second threshold value, the first speed calculation unit 126a specifies a sensing range $SR_1$ having a detectable distance $D_1$ reduced from the previous sensing range $SR_0$. Furthermore, when the rainfall amount, the snowfall amount, or the fog concentration exceeds the first threshold value and exceeds the second threshold value, the first speed calculation unit 126a specifies a sensing range $SR_2$ having a detectable distance $D_2$ reduced from the previous sensing range $SR_1$.

Figure 8:
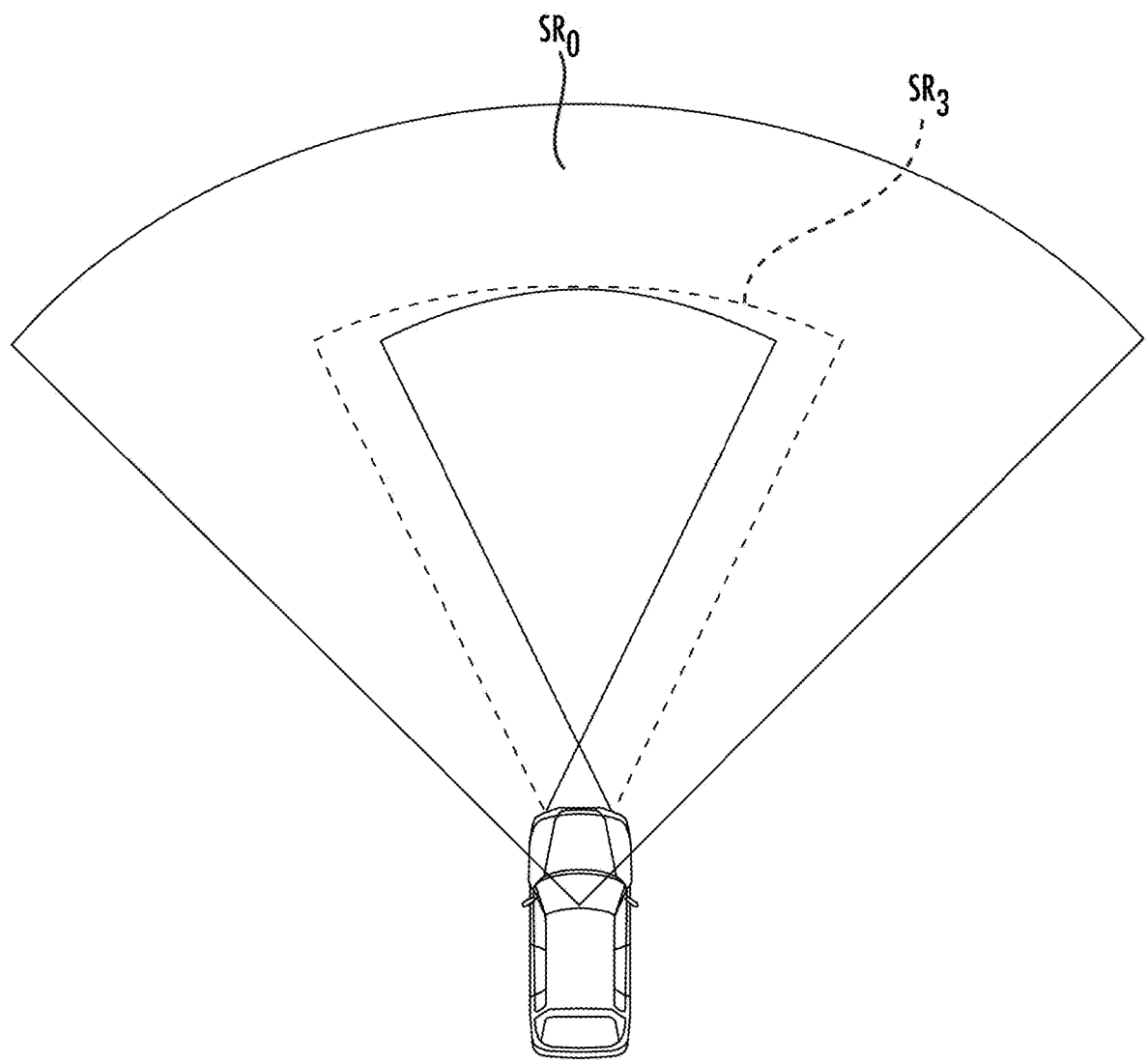
FIG. 8 is a plan view of the vehicle for explaining the process of specifying the sensing range illustrated in FIG. 4.
Figure 9:
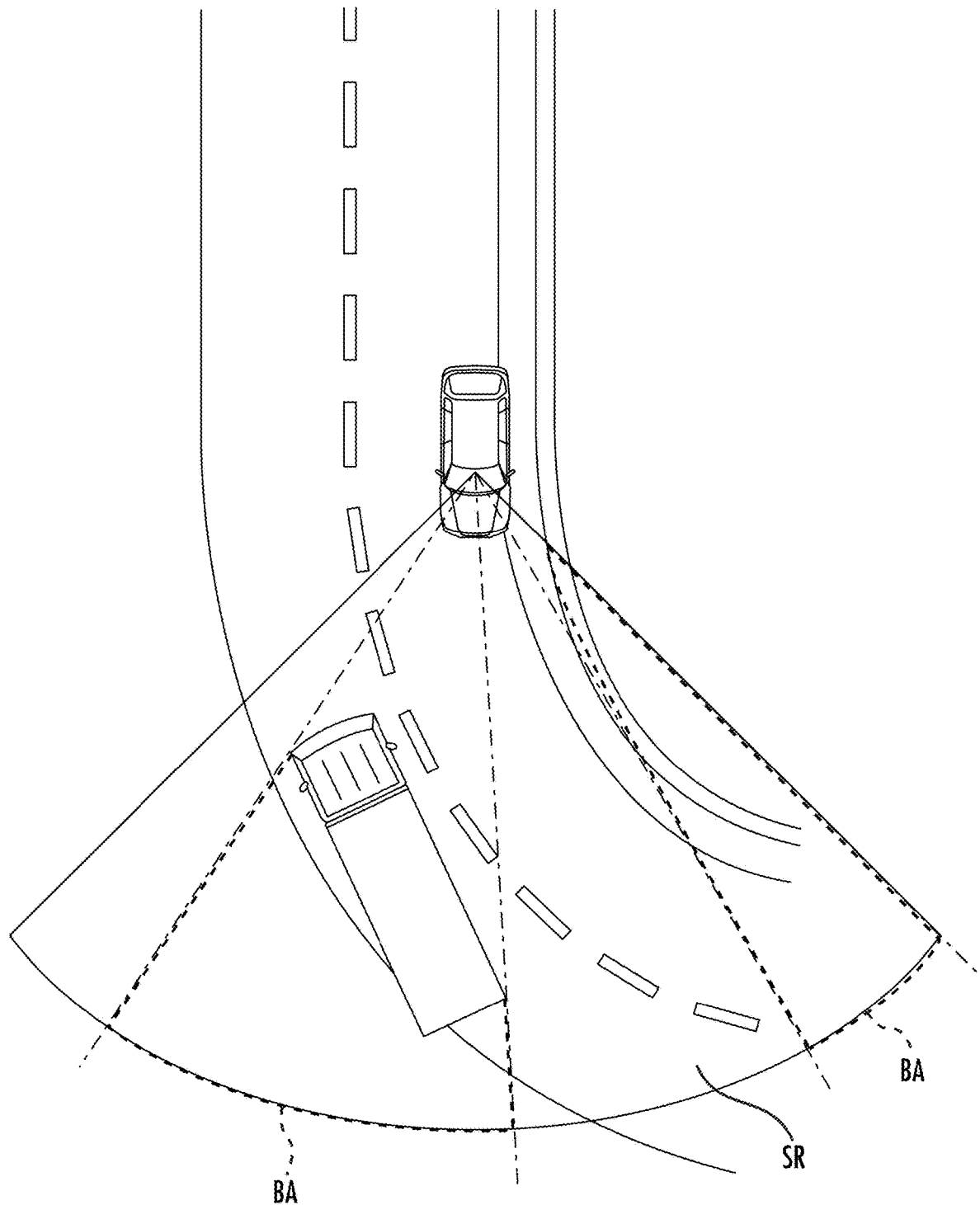
FIG. 9 is a plan view of the vehicle for explaining the process of specifying the sensing range illustrated in FIG. 4.

In addition, as in the example illustrated in FIG. 8, when the brightness falls below a predetermined threshold value, such as at night or in a tunnel where no illumination is installed, the first speed calculation unit 126a specifies a sensing range $SR_3$ corresponding to the illumination range of the headlight reduced from the previous sensing range $SR_0$. Furthermore, as in the example illustrated in FIG. 9, for example, when a blind spot BA occurs in the sensing range SR of the external environment sensor 20 due to an oncoming vehicle, a guardrail, or a building, the target speed calculation unit 126 specifies the sensing range SR from which the blind spot BA has been excluded.

Then, as illustrated in FIGS. 4 and 10, for example, the first speed calculation unit 126*a* executes the process P2 of acquiring the target route TR. As described above, for example, the target route TR is calculated by the target route calculation unit 122, input to the target speed calculation unit 126, and acquired by the first speed calculation unit 126*a*.

Then, as illustrated in FIGS. 4 and 10, for example, the first speed calculation unit 126*a* executes a process P3 of calculating a route length $l_1$ of the target route TR up to an outer edge SRp of the sensing range SR. In this process P3, the first speed calculation unit 126*a* calculates the route length $l_1$ of the target route TR of the vehicle 10 to the outer edge SRp of the sensing range SR based on the sensing range SR specified in the above-described process P1 and the target route TR acquired in the above-described process P2, for example.

Then, the first speed calculation unit 126*a* executes a process P4 of calculating a first speed $V_1$ as illustrated in FIG. 4, for example. In this process P4, the first speed calculation unit 126*a* calculates an upper limit deceleration $g_1$ of the vehicle 10 by using the route length $l_1$ of the target route TR up to the outer edge SRp of the sensing range SR, which has been calculated in the above-described process P3 and the friction coefficient $\mu$ of the road surface, which is acquired from the friction coefficient acquisition unit 125, for example. The upper limit deceleration $g_1$ is, for example, an upper limit deceleration at the time of emergency stop of the vehicle 10, which is calculated based on the friction coefficient $\mu$ of the road surface on which the vehicle 10 travels and further multiplied by the safety factor.

Then, the first speed calculation unit 126*a* calculates the first speed $V_1$ at which the vehicle 10 can stop at the stop position before the outer edge SRp of the sensing range SR by, for example, the following expression (1). The first speed $V_1$ is a speed at which the vehicle 10 traveling along the target route TR can stop at the stop position before the outer edge SRp of the sensing range SR of the external environment sensor 20 at a deceleration that does not exceed the upper limit deceleration $g_1$.

[Math. 1]

$$V_1 = \sqrt{2 \cdot g_1 \cdot l_1} \qquad (1)$$

Then, as illustrated in FIGS. 4 and 11, the second speed calculation unit 126*b* executes processes P5 and P6 of calculating a second speed $V_2$ at which the vehicle 10 can follow the target route TR.

More specifically, for example, the second speed calculation unit 126*b* first acquires an upper limit deceleration $g_2$ before the vehicle 10 enters the curve. For example, the upper limit deceleration $g_2$ of the vehicle 10 before entering the curve is set to a predetermined deceleration that does not cause an occupant of the vehicle 10 to feel uncomfortable, and is stored in the storage device of the vehicle control device 100 in advance.

In addition, the second speed calculation unit 126*b* calculates an upper limit lateral acceleration $g_3$ when the vehicle passes through curves C1, C2, and C3 of the target route TR included in the sensing range SR of the external environment sensor 20. The upper limit lateral acceleration $g_3$ can be set to the lateral acceleration at which the vehicle 10 does not slip, for example, by a centrifugal force acting on the vehicle 10 that travels on each of the curves C1, C2, and C3.

Such a lateral acceleration can be calculated, for example, based on the friction coefficient $\mu$ between the road surface and the tire of the vehicle 10, a grounding area with the road surface, the gravitational acceleration, the curvature radii $r_1$, $r_2$, and $r_3$ of the respective curves C1, C2, and C3, and the like. The curvature radii $r_1$, $r_2$, and $r_3$ of the curves C1, C2, and C3 may be obtained from, for example, the map data 60, or may be obtained by acquiring the road shape in front of the vehicle 10 by the monocular camera 21, the stereo camera 22, the laser radar 24, or the like.

Then, the second speed calculation unit 126*b* calculates second speeds $V_{21}$, $V_{22}$, $V_{23}$, ..., and $V_{2i}$ of the vehicle 10 when the vehicle travels on the curves C1, C2, C3, ..., and Ci of the target route TR included in the sensing range SR, for example, by using the following expression (2). In the following expression (2) $l_{21}$, $l_{22}$, $l_{23}$, ..., and $l_{2i}$ are route lengths from the vehicle 10 to the entry positions of the respective curves C1, C2, C3, ..., and Ci as illustrated in FIG. 11.

$$\left. \begin{array}{l} V_{21} = \sqrt{2 \cdot g_2 \cdot l_{21} + g_3 \cdot r_1} \\ V_{22} = \sqrt{2 \cdot g_2 \cdot l_{22} + g_3 \cdot r_2} \\ V_{23} = \sqrt{2 \cdot g_2 \cdot l_{23} + g_3 \cdot r_3} \\ \vdots \\ V_{2i} = \sqrt{2 \cdot g_2 \cdot l_{2i} + g_3 \cdot r_1} \end{array} \right\} \qquad (2)$$

As illustrated in FIG. 11, each of the second speeds $V_{21}$, $V_{22}$, $V_{23}$, ..., and $V_{2i}$ in the above expression (2) is a speed at which the vehicle can decelerate at the upper limit deceleration $g_2$ up to the entry positions C1*i*, C2*i*, C3*i*, ..., and Ci*i* of the respective curves C1, C2, C3, ..., and Ci and the respective curves C1, C2, C3, ..., and Ci can be bent. That is, for example, the second speed calculation unit 126*b* calculates the second speeds $V_{21}$, $V_{22}$, $V_{23}$, ..., and $V_{2i}$ at which the vehicle 10 can decelerate up to the entry positions C1*i*, C2*i*, C3*i*, ..., and Ci*i* at a deceleration that does not exceed the predetermined upper limit deceleration $g_2$.

In the example illustrated in FIG. 11, the second speed calculation unit 126*b* calculates the second speeds $V_{21}$, $V_{22}$, $V_{23}$, ..., and $V_{2i}$ for the respective curves C1, C2, C3, ..., and Ci having different curvature radii $r_1$, $r_2$, $r_3$, ..., and $r_i$. The second speeds can be calculated in other units. For example, the second speed calculation unit 126*b* may calculate the second speeds $V_{21}$, $V_{22}$, $V_{23}$, ..., and $V_{2i}$ at which the vehicle 10 can decelerate with a deceleration that does not exceed the predetermined upper limit deceleration $g_2$ up to the entry position in each section in units of sections obtained by dividing the target route TR by a predetermined division length.

Note that, for example, the second speed calculation unit 126*b* may calculate each of the second speeds $V_{21}$, $V_{22}$, $V_{23}$, ..., and $V_{2i}$ by using only the upper limit lateral acceleration $g_3$ without using the upper limit deceleration $g_2$. In this case, the term including the upper limit deceleration $g_2$ in the above expression (2) becomes zero. Each of the second speeds $V_{21}$, $V_{22}$, $V_{23}$, ..., and $V_{2i}$ is a speed at which the vehicle can bend on each of the curves C1, C2, C3, ..., and Ci, that is, a speed at which the vehicle 10 can follow the target route TR calculated using the curvature radii $r_1$, $r_2$, $r_3$, ..., and $r_i$ of the target route TR and the friction coefficient $\mu$ of the road surface.

For example, when the upper limit lateral acceleration $g_3$ calculated as described above exceeds the range of the lateral acceleration that does not cause the occupant of the vehicle 10 to feel uncomfortable, the second speed calculation unit 126b may set the upper limit lateral acceleration of the range as the upper limit lateral acceleration $g_3$. That is, the second speed calculation unit 126b may calculate the second speed $V_2$ at which the vehicle can follow the target route TR at a lateral acceleration that does not exceed the predetermined upper limit lateral acceleration $g_3$, such as a lateral acceleration that does not cause the occupant of the vehicle 10 to feel uncomfortable.

Then, as illustrated in FIG. 4, the second speed calculation unit 126b executes a process P6 of selecting the minimum second speed $V_2$. In this process P6, the second speed calculation unit 126b sets the minimum speed among the plurality of calculated second speeds $V_{21}, V_{22}, V_{23}, \ldots$, and $V_{2i}$ as the second speed $V_2$ by, for example, using the following expression (3). As a result, the second speed $V_2$ can be set to a speed at which the vehicle 10 can follow the entire target route TR included in the sensing range SR.

[Math. 3]

$$V_2 = \min(V_{21}, V_{22}, V_{23}, \ldots, V_{2i}) \quad (3)$$

Then, the target speed setting unit 126f executes a process P7 of calculating the target speed $V_{tgt}$. In this process P7, the target speed setting unit 126f selects the minimum speed out of the first speed $V_1$ and the second speed $V_2$ and sets the selected minimum speed as the target speed $V_{tgt}$ by using, for example, the following expression (4). As a result, the target speed $V_{tgt}$ can be set to a speed at which the vehicle 10 can stop at the stop position before the outer edge SRp of the sensing range SR of the external environment sensor 20 and the vehicle 10 can follow the target route TR.

[Math. 4]

$$V_{tgt} = \min(V_1, V_2) \quad (4)$$

Then, the travel planning unit 120 executes a process P8 of outputting the target speed $V_{tgt}$ calculated and set by the target speed calculation unit 126 as described above to the travel control unit 130 illustrated in FIG. 2, for example. Here, for example, the travel planning unit 120 outputs the target route TR to the travel control unit 130 together with the target speed $V_{tgt}$. The travel control unit 130 outputs control commands to the brake control unit 140, the steering control unit 150, and the driving force control unit 160 based on the target speed $V_{tgt}$ and the target route TR input from the travel planning unit 120.

The brake control unit 140, the steering control unit 150, and the driving force control unit 160 respectively control the hydraulic unit 19, the brake caliper 18, the power steering 14, and the power source 11 based on the control commands input from the travel control unit 130. This enables automatic driving of the vehicle 10.

The operation of the vehicle control device 100 of the present embodiment will be described below.

The vehicle control device 100 in the present embodiment includes the target speed calculation unit 126 that calculates the target speed $V_{tgt}$ of the vehicle 10. The target speed calculation unit 126 includes the first speed calculation unit 126a, the second speed calculation unit 126b, and the target speed setting unit 126f. The first speed calculation unit 126a calculates, by using the route length $l_1$ of the target route TR of the vehicle 10 up to the outer edge SRp of the sensing range SR of the external environment sensor 20 of the vehicle 10 and the friction coefficient μ of the road surface, the first speed $V_1$ at which the vehicle 10 can stop at the stop position before the outer edge SRp. The second speed calculation unit 126b calculates, by using the curvature radii $r_1, r_2, r_3, \ldots$, and $r_i$ of the target route TR and the friction coefficient μ, the second speed $V_2$ at which the vehicle 10 can follow the target route TR. Then, the target speed setting unit 126f selects the minimum speed out of the first speed $V_1$ and the second speed $V_2$ and sets the minimum speed to the target speed $V_{tgt}$.

With such a configuration, even when the target route TR included in the sensing range SR includes the curves C1, C2, C3, ..., and Ci, the vehicle control device 100 can prevent the slip of the vehicle 10 and cause the vehicle 10 to travel with following the target route TR. Further, even when there is an obstacle outside the sensing range SR of the external environment sensor 20, it is possible to reliably stop the vehicle 10 before the obstacle. Therefore, according to the present embodiment, it is possible to provide the vehicle control device 100 capable of suppressing a decrease in safety due to an obstacle that cannot be detected by the external environment sensor 20 and improving the safety of the vehicle 10 while the vehicle 10 is traveling on the target route TR including the curves C1, C2, C3, ..., and Ci.

In addition, in the vehicle control device 100 in the present embodiment, the first speed calculation unit 126a calculates the first speed $V_1$ at which the vehicle 10 can stop at the stop position at the deceleration that does not exceed the predetermined upper limit deceleration $g_1$. The second speed calculation unit 126b calculates the second speed $V_2$ at which the vehicle can follow the target route TR at the lateral acceleration that does not exceed the predetermined upper limit lateral acceleration $g_3$.

With such a configuration, the vehicle control device 100 in the present embodiment can more reliably stop the vehicle 10 at the stop position before the outer edge SRp of the sensing range SR by using the above-described upper limit deceleration at the time of emergency stop of the vehicle 10 as the predetermined upper limit deceleration $g_1$. In addition, by using the upper limit deceleration that does not causes the occupant of the vehicle 10 to feel uncomfortable, as the predetermined upper limit deceleration $g_1$, it is possible to stop the vehicle 10 at the stop position before the outer edge SRp of the sensing range SR without causing the occupant of the vehicle 10 to feel uncomfortable. Furthermore, by using the upper limit lateral acceleration that does not cause the occupant of the vehicle 10 to feel uncomfortable, as the predetermined upper limit lateral acceleration $g_3$, it is possible to pass through the target route TR including the curves C1, C2, C3, ..., and Ci without causing the occupant of the vehicle 10 to feel uncomfortable.

In addition, in the vehicle control device 100 in the present embodiment, the second speed calculation unit 126b calculates the second speed $V_2$ at which the vehicle 10 can decelerate at a deceleration that does not exceed the predetermined upper limit deceleration $g_2$ up to the entry positions C1i, C2i, C3i, ..., and Cii of the curves C1, C2, C3, ..., and Ci having different curvature radii $r_1, r_2, r_3, \ldots$, and $r_i$ included in the target route TR.

With such a configuration, the vehicle control device 100 in the present embodiment can use, as the predetermined upper limit deceleration $g_2$, the upper limit deceleration that does not cause the occupant of the vehicle 10 to feel uncomfortable. As a result, it is possible to decelerate the vehicle 10 to a speed at which the vehicle 10 can bend on the curves C1, C2, C3, ..., and Ci to the entry positions C1i, C2i, C3i, ..., and Cii of the curves C1, C2, C3, ..., and Ci without causing the occupant of the vehicle to feel uncomfortable.

In addition, in the vehicle control device 100 in the present embodiment, as described above, the second speed calculation unit 126b can also calculate the second speed $V_2$ at which the vehicle 10 can decelerate up to the entry position of each section obtained by dividing the target route TR by the predetermined division length at a deceleration that does not exceed the predetermined upper limit deceleration $g_2$.

With such a configuration, the vehicle control device 100 in the present embodiment can use the upper limit deceleration that does not cause the occupant of the vehicle 10 to feel uncomfortable, as the predetermined upper limit deceleration $g_2$ as described above. As a result, it is possible to decelerate the vehicle 10 to a speed at which the vehicle 10 can follow each section of the target route TR to the entry position of each section of the target route TR without causing the occupant of the vehicle 10 to feel uncomfortable.

In the vehicle control device 100 in the present embodiment, the target speed calculation unit 126 includes the legal speed acquisition unit 126c that acquires the legal speed of the target route TR. In this case, for example, the target speed setting unit 126f selects the minimum speed among the first speed $V_1$, the second speed $V_2$, and the legal speed, and sets the minimum speed as the target speed $V_{tgt}$.

With such a configuration, it is possible to prevent an occurrence of a situation in which the speed of the vehicle 10 exceeds the legal speed. Note that the legal speed acquisition unit 126c may acquire the legal speed of the target route TR from the map data 60, or may acquire the legal speed based on the recognition result of the road sign by the external environment recognition unit 110, for example.

In addition, in the vehicle control device 100 in the present embodiment, the target speed calculation unit 126 includes the setting speed acquisition unit 126d that acquires the setting speed set by the occupant of the vehicle 10. In this case, for example, the target speed setting unit 126f selects the minimum speed among the first speed $V_1$, the second speed $V_2$, and the setting speed, and sets the selected speed as the target speed $V_{tgt}$.

With such a configuration, it is possible to prevent an occurrence of a situation in which the speed of the vehicle 10 exceeds the setting speed. Note that the setting speed acquisition unit 126d may acquire the setting speed by the occupant of the vehicle 10 from an input device such as a touch panel mounted on the vehicle 10, or may acquire the setting speed by a microphone mounted on the vehicle 10 and a voice recognition unit that recognizes the voice of the occupant, for example.

In addition, in the vehicle control device 100 in the present embodiment, the target speed calculation unit 126 includes the upper limit speed setting unit 126e that sets an upper limit speed in accordance with the road width of the target route TR. In this case, for example, the target speed setting unit 126f selects the minimum speed among the first speed $V_1$, the second speed $V_2$, and the upper limit speed, and sets the selected speed as the target speed $V_{tgt}$.

With such a configuration, it is possible to prevent an occurrence of a situation in which the speed of the vehicle 10 exceeds the upper limit speed set according to the road width, and to improve the safety of the vehicle 10. Note that the upper limit speed setting unit 126e may acquire the road width of the target route TR from the map data 60, or may acquire the road width based on the recognition result of the road sign by the external environment recognition unit 110, for example.

In addition, the vehicle control device 100 in the present embodiment includes the external environment recognition unit 110, the travel planning unit 120, and the travel control unit 130. The external environment recognition unit 110 acquires the external environment information from the external environment sensor 20 and recognizes an object. The travel planning unit 120 acquires travel information including the speed of the vehicle 10 from the vehicle sensor 30 of the vehicle 10, acquires the recognition result of an object from the external environment recognition unit 110, and generates a travel plan of the vehicle 10. The travel control unit 130 causes the vehicle 10 to travel along the target route TR at the target speed $V_{tgt}$. The travel planning unit 120 includes the target speed calculation unit 126, the target route calculation unit 122 that calculates the target route TR, and the friction coefficient acquisition unit 125 that acquires the friction coefficient μ between the grounding portion of the vehicle 10 and the road surface.

With such a configuration, the vehicle control device 100 in the present embodiment can calculate the target speed $V_{tgt}$ at which the vehicle 10 can follow the target route TR and can reliably stop before the obstacle, and perform the automatic driving of the vehicle 10. Therefore, according to the present embodiment, it is possible to provide the vehicle control device 100 capable of improving the safety of the vehicle 10 as compared with the above conventional technique.

Hitherto, the vehicle control device according to the embodiments of the present disclosure has been described in detail above with reference to the drawings. The specific configuration is not limited to the embodiments and the design changes and the like without departing from the gist of the present disclosure are included in the present disclosure.

REFERENCE SIGNS LIST 10 vehicle
20 external environment sensor
100 vehicle control device
110 external environment recognition unit
120 travel planning unit
122 target route calculation unit
125 friction coefficient acquisition unit
126 target speed calculation unit
126a first speed calculation unit
126b second speed calculation unit
126c legal speed acquisition unit
126d setting speed acquisition unit
126e upper limit speed setting unit
126f target speed setting unit
130 travel control unit
C1-Ci curve
C1i-Cii entry position
$g_1$ upper limit deceleration
$g_2$ upper limit deceleration
$g_3$ upper limit lateral acceleration
$l_1$ route length
$V_{tgt}$ target speed
$r_1$-$r_i$ curvature radius
SR sensing range
SRp outer edge
TR target route
$V_1$ first speed
$V_2$ second speed
μ friction coefficient

The invention claimed is:

1. A vehicle controller to perform automatic driving of a vehicle, comprising:
   a target speed calculator that calculates a target speed of the vehicle, the target speed calculator including
      a first speed calculator that calculates, by using a friction coefficient of a road surface and a route length of a target route of the vehicle up to an outer edge of a sensing range of an external environment sensor of the vehicle, a first speed at which the vehicle is able to stop at a stop position before the outer edge,
      a second speed calculator that calculates, by using a curvature radius of the target route and the friction coefficient, a second speed at which the vehicle is able to follow the target route, and
      a target speed setter that selects a minimum speed of the first speed and the second speed and sets the minimum speed as the target speed; and
   a travel controller that causes the vehicle to travel along the target route at the target speed.

2. The vehicle controller according to claim 1, wherein the first speed calculator calculates the first speed at which the vehicle is able to stop at the stop position at a deceleration that does not exceed a predetermined upper limit deceleration, and
   the second speed calculator calculates the second speed at which the vehicle is able to follow the target route at a lateral acceleration that does not exceed a predetermined upper limit lateral acceleration.

3. The vehicle controller according to claim 1, wherein the second speed calculator calculates the second speed at which the vehicle is able to decelerate at a deceleration that does not exceed a predetermined upper limit deceleration up to an entry position of each curve having a different curvature radius included in the target route.

4. The vehicle controller according to claim 1, wherein the second speed calculator calculates the second speed at which the vehicle is able to decelerate at a deceleration that does not exceed a predetermined upper limit deceleration up to an entry position of each section obtained by dividing the target route by a predetermined division length.

5. The vehicle controller according to claim 1, wherein the target speed calculator includes a legal speed acquirer acquisition unit that acquires a legal speed of the target route, and
   the target speed setter selects a minimum speed among the first speed, the second speed, and the legal speed, and sets the minimum speed as the target speed.

6. The vehicle controller according to claim 1, wherein the target speed calculator includes a setting speed acquirer acquisition unit that acquires a setting speed set by an occupant of the vehicle, and
   the target speed setter selects a minimum speed among the first speed, the second speed, and the setting speed, and sets the minimum speed as the target speed.

7. The vehicle controller according to claim 1, wherein the target speed calculator includes an upper limit speed setter that sets an upper limit speed in accordance with a road width of the target route, and
   the target speed setter selects a minimum speed among the first speed, the second speed, and the upper limit speed, and sets the minimum speed as the target speed.

8. The vehicle controller according to claim 1, further comprising:
   an external environment recognizer that acquires external environment information from the external environment sensor and recognizes an object;
   a travel planner that acquires travel information including a speed of the vehicle from a vehicle sensor of the vehicle, acquires a recognition result of the object from the external environment recognizer, and generates a travel plan of the vehicle; and
   wherein the travel planner includes the target speed calculator and a target route calculator that calculates the target route.

* * * * *